US005799254A

United States Patent [19]
Karmi et al.

[11] Patent Number: 5,799,254
[45] Date of Patent: Aug. 25, 1998

[54] METHOD AND APPARATUS FOR PROVIDING A DIAL TONE TO A TELEPHONE WITHIN A WIRELESS LOCAL LOOP SYSTEM

[75] Inventors: Gadi Karmi, La Jolla; Barry Robbins, San Diego, both of Calif.

[73] Assignee: QUALCOMM Incorporated, San Diego, Calif.

[21] Appl. No.: 898,741

[22] Filed: Jul. 23, 1997

Related U.S. Application Data

[63] Continuation of Ser. No. 496,421, Jun. 19, 1995.
[51] Int. Cl.$^6$ .................... H04M 11/00; H04Q 7/00
[52] U.S. Cl. .................. 455/528; 455/515; 455/401
[58] Field of Search ............................. 455/528, 515, 455/464, 401, 417, 411

[56] References Cited

U.S. PATENT DOCUMENTS

| | | | |
|---|---|---|---|
| 4,028,500 | 6/1977 | McClure et al. | 179/41 A |
| 4,220,820 | 9/1980 | Mallien, II | 179/2 EB |
| 4,628,152 | 12/1986 | Akerberg | 379/51 |
| 4,953,198 | 8/1990 | Daly et al. | 379/61 |
| 4,959,851 | 9/1990 | Tobolski, Jr. et al. | 455/411 X |
| 5,237,603 | 8/1993 | Yamagata et al. | 455/464 |
| 5,353,331 | 10/1994 | Emery et al. | 379/58 |
| 5,594,782 | 1/1997 | Zicker et al. | 455/417 |

FOREIGN PATENT DOCUMENTS

| | | | |
|---|---|---|---|
| 1189240 | 7/1989 | European Pat. Off. | H04B 7/26 |

*Primary Examiner*—David R. Hudspeth
*Assistant Examiner*—Scott Richardson
*Attorney, Agent, or Firm*—Russell B. Miller; Brian S. Edmonston

[57] ABSTRACT

The wireless local loop system employs cellular technology to provide telephone service to fixed telephones of remote stations having otherwise conventional handsets. The remote station emulates a conventional public switched telephone network by providing an artificial dial tone from the handset of the remote station, after the handset is taken off-hook. The artificial dial tone is locally generated by the remote station. The system, however, delays providing the dial tone if the system is busy, i.e. if the system is under a load condition. To this end, the system monitors load levels and transmits signals to the remote stations indicating load conditions. A remote station, prior to granting at dial tone to the user, receives the load condition signals, determines whether the system is currently under load and, if so, defers the dial tone. Hence, if the system is under a load condition, such that no lines or frequency channels are available, the user is not presented a dial tone until a line or channel becomes available. By deferring the dial tone until a line or channel is available, the wireless local loop system more effectively emulates a PSTN.

36 Claims, 9 Drawing Sheets

METHOD AND APPARATUS FOR PROVIDING A DIAL TONE TO A TELEPHONE WITHIN A WIRELESS LOCAL LOOP SYSTEM

This is a Continuation of application Ser. No. 08/496,421, filed Jun. 19, 1995.

BACKGROUND OF THE INVENTION

I. Field of the Invention.

The invention generally relates to wireless local loop systems and in particular to a wireless local loop system employing code division multiple access (CDMA) technology.

II. Description of Related Art.

Wireless local loop systems provide voice telephone and other telephonic transmission services, such as facsimile, to users that do not have access to public switched telephone network (PSTN) lines. More specifically, the wireless local loop system exploits cellular technology for providing telephone service to fixed, rather than mobile, telephones such as can be found in rural areas or in many emerging third world countries. The user is provided with a telephone handset similar in size, shape and operation to a conventional telephone handset (i.e. one connected to a PSTN). However, rather than being connected to a PSTN line, the telephone handset of the wireless local loop system is connected to, or includes, a wireless transmitter similar to those employed in conventional cellular telephones. In one implementation, the telephone handset is connected by wiring to a fixed wireless transmitter located nearby, perhaps on the roof of a building. More than one telephone handset may be connected to a single wireless transmitter. One or more cellular base stations are installed in the vicinity and signals are transmitted between the base stations and various of the remote wireless transmitters in much the same manner as with conventional cellular signals. In implementations where several handsets are connected to a single wireless transmitter, the wireless transmitter is often referred to as concentrated subscriber system (CSS).

Hence the wireless local loop systems operate in much the same manner as conventional cellular systems but the remote stations, i.e. the handsets and CSS's, are fixed. The general goal of the wireless local loop system is to emulate, with cellular technology, the operation of a PSTN system. Unlike a PSTN system, a typical cellular system does not provide a dial tone to the user. Rather the user enters a phone number, then presses a send button. To more closely emulate a PSTN, it has been proposed that the handsets of the wireless local loop system be configured to provide an artificial dial tone to the user. In one such proposed implementation, the system provides a dial tone as soon as the handset is taken off-hook. Upon hearing the dial tone, the user dials a number. The handset detects the last number dialed and generates a send signal for accessing the cellular system.

Depending upon the capacity of the local cellular system and upon the amount of usage, the cellular system may be loaded with no lines or frequency channels available for the user. This can occur as a result of, for example, all physical lines within the system or all available frequency channels being busy. When the system has no further lines or channels available, it is said to be under a load condition. In any case, the connection will not be completed. This can result in considerable annoyance to the user who, upon hearing a dial tone, is led to believe that a line is available. If the user is attempting to place an emergency call, perhaps to the local police, hospital or fire department, the confusion and delay caused by the erroneous dial tone may have serious consequences.

Systems which grant a dial tone then attempt system access before determining channel or line availability have other problems as well. In a system using CDMA technology, the additional transmissions associated with access attempts by the remote station can cause additional interference that hinders the overall quality of other traffic within the system.

It would be desirable to provide a wireless local loop system, particularly for installation in emerging third world countries, which avoids the potentially dangerous problems noted above and which more properly emulates a PSTN system from the user's perspective. Related problems can occur in other wireless systems under load conditions, even those which do not present a dial tone, including cellular and satellite mobile systems and it would also be desirable to provide improved handling of loads in other wireless or non-wireless signal transmission systems. It is to these ends that the invention is primarily drawn.

SUMMARY OF THE INVENTION

A wireless local loop system is provided which monitors load levels and transmits signals to the remote stations indicating load conditions. A remote station, prior to granting a dial tone to the user, receives the load condition signals, determines whether the system is currently under load and, if so, defers the dial tone. Hence, if the system is under a load condition, such that no additional lines or frequency channels are available, the user is not presented a dial tone until a line or channel becomes available. In this manner, the user is not confused or annoyed by hearing a dial tone when no lines or channels are available. Moreover, when implemented within CDMA-based wireless local loop systems, the aforementioned interference occurring as a result of attempts by users to access the system, is avoided.

The invention may be implemented in a wide range of systems and embodiments consistent with the general principles of the invention. In one embodiment, a wireless local loop system is provided which employs cellular CDMA technology where a plurality of transmission frequency bands (referred to hereafter as "frequencies") are available. The determination of load conditions is performed on a frequency by frequency basis. Load information for each frequency is transmitted on a paging channel associated with the respective frequency. The load information identifies whether the frequency is currently loaded. When a remote station is activated by taking the handset off-hook, the remote station sequentially listens to each of the paging channels of the various frequencies until finding an available frequency. Once an available frequency is found, the remote station immediately provides a dial tone and then attempts an access after detecting the last dialed digit. Such actions can result in an immediate return to a load condition if several other remote stations are also awaiting an open frequency. Hence, it may be desirable to further defer grant of the dial tone by a random period of time determined by the remote station. Parameters for randomization based on system usage are transmitted by the base station on the paging channels as well. The parameters are used by the remote station to generate the random period of time. The randomization parameters can be adaptively varied in accordance with actual system usage to minimize any additional delay while also preventing further load conditions.

3

In another embodiment, the load information transmitted by the base station also identifies whether alternative channels are available which are not under a load condition. The remote station first selects a frequency and decodes its paging channel. If the frequency is loaded and an alternative non-loaded frequency is indicated, the remote station immediately switches to the alternative frequency. If no alternative frequency is available, the remote station waits until one becomes available before granting a dial tone.

In yet another embodiment, each paging channel carries information identifying the current level of load on the respective frequency, even when not under a load condition. The remote station checks each of the paging channels until finding the frequency having the lowest load value, then grants a dial tone and attempts an access. If all frequencies are fully loaded, the dial tone is delayed and no access is attempted until a frequency becomes available. By selecting the frequency having the lowest load level, system resources are more effectively used. In still another embodiment, each paging channel transmits the load levels of all of the frequencies, thereby obviating the need for the remote station to scan through all frequencies to find the lowest load level. Rather, the remote station selects any frequency, determines the lowest load level therefrom, then immediately proceeds to the associated frequency.

Although the invention is particularly well suited for use in wireless local loop systems which provide a dial tone to a user, the invention can also be advantageously exploited in other wireless, or non-wireless, systems as well. For example, within an otherwise conventional cellular system, load condition information of the type described above is used by a remote station to generate local busy signals, rather than requiring such information to be generated by the base station then transmitted to the remote station as presently implemented. Principles of the invention may also be exploited within satellite mobile communication systems.

As can be appreciated, a wide range of embodiments may be configured in accordance with the invention and no attempt is made herein to list or describe all possible embodiments.

BRIEF DESCRIPTION OF THE DRAWINGS

The features, objects and advantages of the invention will become more apparent from the detailed description set forth below when taken in conjunction with the drawings in which like reference characters identify like elements throughout and wherein.

4

DETAILED DESCRIPTION OF EXEMPLARY EMBODIMENTS

Referring to the Figures, exemplary embodiments of the invention will now be described. It should be kept in mind that the invention can be implemented in other ways than these exemplary embodiments. For example, although the following primarily describes the invention in relation to a wireless local loop system employing CDMA cellular technology, the invention can be implemented in other systems as well.

The invention will primarily be described with reference to block diagrams and flow charts which highlight important features of the invention. For brevity and clarity, numerous implementation details which are not pertinent to the overall concept of the invention are not described. The flow charts will primarily be described in relation to the method or logic steps illustrated therein by individual blocks. However, the individual blocks of each flow chart also represent hardware elements configured for performing the stated method or logic step. Depending upon the implementation, some of the hardware elements may be, for example, either discrete hardware elements such as ASIC's or portions of a programmable general purpose computer.

First an overview of a wireless local loop system will be provided with reference to FIG. 1, then details of how the system of FIG. 1 manages load information will be set forth with reference to the remaining figures.

Figure 1:
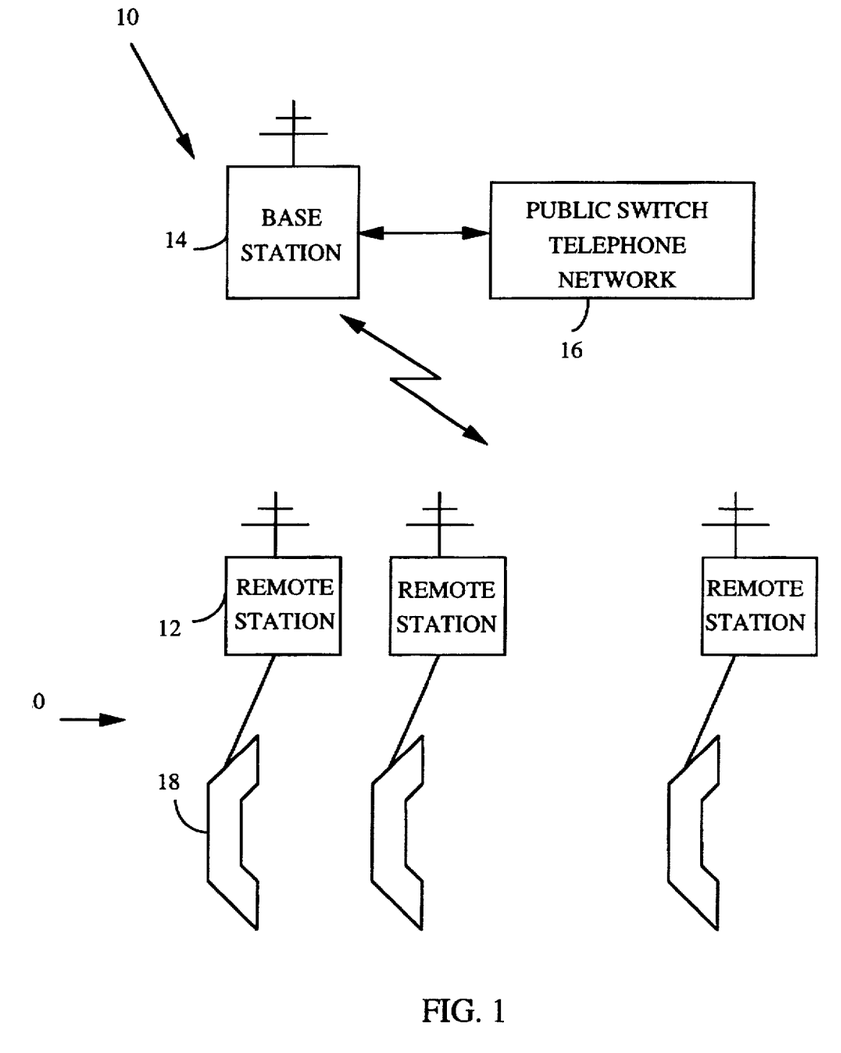
FIG. 1 is a block diagram illustrating an exemplary embodiment of a wireless local loop system configured in accordance with principles of the invention.

FIG. 1 illustrates a wireless local loop system 10 having a set of fixed remote stations 12 and a fixed base station 14. Base station 14 is connected to a PSTN 16 (or is otherwise in communication with the PSTN) and to other base stations (not shown) either directly or through other call processing systems such as PSTN 16. Each remote station includes a handset 18 connected, perhaps by a direct physical line, to wireless transmitter and receiver 20 which may be a CSS. Base station 14 communicates with the various remote stations 12 using CDMA cellular technology. The system of FIG. 1 is shown at a very high level. No attempt is made to illustrate all of the various components necessary for actual implementation. Additional information regarding wireless local loop systems and CDMA systems may be found in U.S. Pat. No. 4,901,307 entitled "Spread Spectrum Multiple Access Communication System Using Satellites or Terrestrial Repeaters" and 5,103,459 entitled "System and Method for Generating Signal Waveforms in a CDMA Cellular Telephone System" both of which are assigned to the assignee of the present invention and incorporated by reference herein. Further information may be found in specification IS-95 from the Telecommunication Industry Association (2001 Pennsylvania Avenue, Suite 800, Washington D.C. 20006) entitled "Mobile Station-Base Station Compatibility Standard for Dual Mode Wideband Spread Spectrum Cellular System" which is also incorporated by reference.

Briefly, base station 14 transmits signals to remote stations 12 via a forward or downlink on one of ten CDMA frequencies each covering, for example, 1.23 MHz of radio frequency bandwidth. Each CDMA frequency carries a pilot channel, a sync channel, and a set of paging and traffic channels. The pilot channel are used as timing and frequency reference signals. The sync channel carries signals necessary for system timing and protocol compatibility. The paging channels carry signals to indicate that the base station is attempting to contact one of the particular remote stations. The traffic channels carry traffic specific to one telephone call such as a voice call or a facsimile message. The pilot, sync and paging channels are broadcast channels monitored by all remote stations that are in operation. The traffic channels are monitored only by the particular remote stations involved in the specific telephone call. The remote stations transmit signals to the base station via a reverse link (also known as "uplink") having an access channel and a set of traffic channels.

System 10 is configured to emulate a PSTN system from the user's perspective. Each handset 18 is configured to have the same size, shape and operational feel of a conventional telephone connected to the PSTN. In a PSTN system, when a user takes a telephone handset off-hook, the system provides a dial tone to the user through the handset if a line is available. No dial tone is provided unless and until a line becomes available. Likewise, in the system of FIG. 1, remote stations 12 are configured to provide a dial tone to the user upon taking the handset off-hook if a line is available. In the context of the CDMA system of FIG. 1, "line availability" means that a code channel or frequency channel necessary to place a call is available. If no such line is available, the system is said to be under a load condition. Hence, to properly emulate a PSTN from the user's perspective, remote stations 12 do not provide a dial tone unless and until any load condition is resolved, i.e. a "line" becomes available. Once a dial tone is presented, the user enters a desired telephone number and the remote transmits a signal to the base station on the access channel to commence the telephone call.

In the embodiment herein described, base station 14 determines whether the system is subject to a load condition and transmits information on the paging channel to remote stations 12 which delay providing a dial tone when the respective handset 18 is taken off-hook if the system is under a load condition. Various methods by which the base station detects load conditions and by which the remote stations respond to the load conditions will now be described with reference to the remaining figures.

Figure 2:
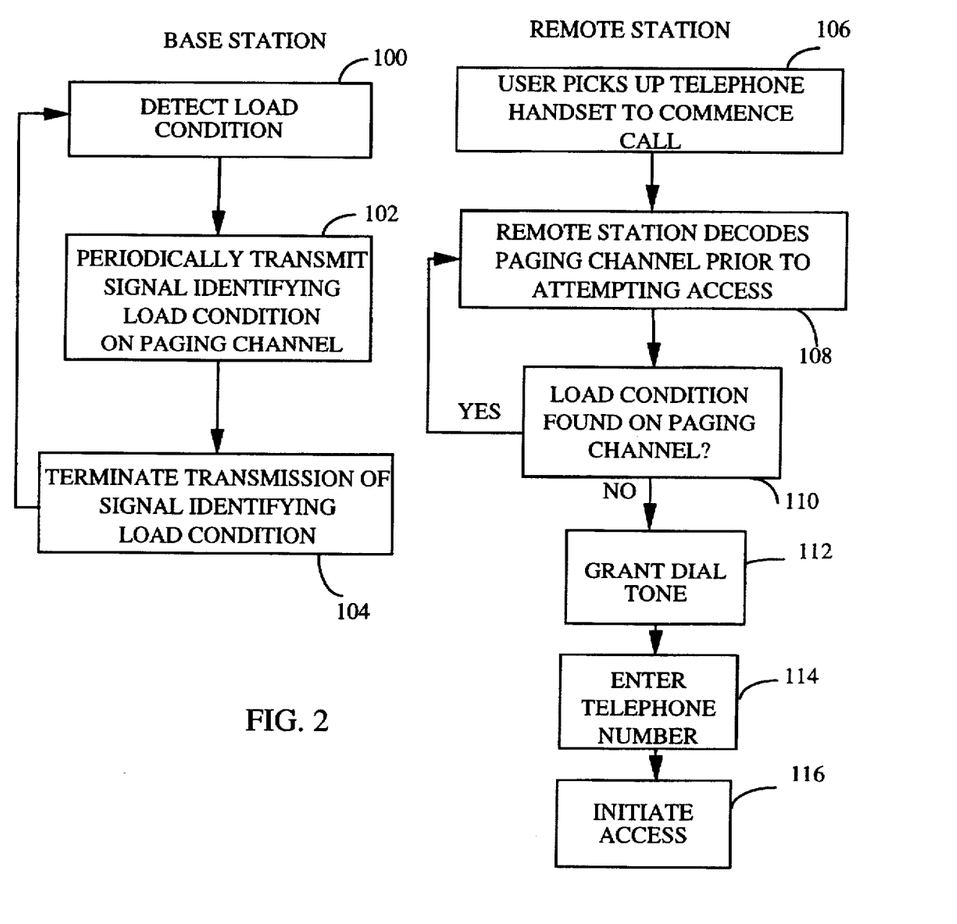
FIG. 2 is a flow chart illustrating a method, implemented by the system of FIG. 1, for processing load condition information wherein a remote station defers granting a dial tone to a user until a load condition is resolved.

FIG. 2 illustrates a simplified single frequency embodiment. The operations of the base station are shown in tandem with those of the remote station. However, it should be understood that these devices operate independently and there is not necessarily any direct correspondence between the operations of the base station and those of the remote station. Initially, the base station detects a load condition at step 100. A variety of parameters may be employed to provide a quantitative determination of whether the system is under a load condition. In one embodiment, the total number of bits per second transmitted and received by the base station is tracked. A load condition is deemed to occur if the number of bits per second exceeds some predetermined threshold. The threshold may be adaptively varied as needed. In another embodiment, the total power transmitted by the base station is compared against a power threshold. The use of total power is a particularly convenient basis for determining load conditions, in part because the overall system includes a power control feedback loop for regulating transmitted power. Hence, the total amount of power is already determined within the power control feedback loop and the base station need only access the power value and compare it against a predetermined threshold.

Once the base station determines that the system is under a load condition, the base station broadcasts a signal within the paging channel indicating same, at step 102. The signal may take the form of a unique sequence of bits within a dedicated field within the paging channel. As can be appreciated, because all remote stations are not decoding the paging channel at all times, the load condition signal should be frequently transmitted. Preferably, the signal is repeated periodically along with all other information transmitted on the paging channel. Sometime thereafter, the base station detects that the load condition has terminated or has been otherwise resolved and terminates transmission of the signal identifying the load condition on the paging channel. Hence, the lack of a load condition is identified or represented by the lack of the load condition signal. In another embodiment, the base station transmits a unique signal that positively indicates that the there is no load condition. For example, the signal indicating a load condition may comprise one set of binary symbols, whereas the signal indicating the absence of a load condition may comprise a different set of binary symbols. Alternatively, the system may transmit a positive signal only while the system is not loaded, and transmits no signal if it is loaded. In any case, the sequence of steps performed by the base station are repeated sequentially at all times while the base station is in operation—typically twenty-four hours a day.

At any time during the cycle of steps performed by the base station, a user may take the handset off-hook in one of the remote stations as shown in step 106. The remote station detects the off-hook condition and immediately decodes the paging channel, step 108, to determine whether the system is under a load condition. If at step 110, the remote station detects the load condition signal on the paging channel, execution returns to step 108 and continues in a loop until the load condition signal is terminated (at step 104 of the base station operation.) Thereafter, execution proceeds to step 112 where the remote station provides an artificial dial tone to the user. Upon hearing the dial tone, the user enters a desired telephone number at 114 and the remote station initiates system access at step 116 to place the telephone call. Access is performed by transmitting appropriate information on the access channel in accordance with conventional techniques which will not be further described.

Hence, the remote station defers providing a dial tone unless and until the load condition terminates. Depending upon the capacity of the wireless local loop system and the amount of usage, the dial tone may be delayed, if at all, fairly briefly or perhaps for a longer duration. As noted above, wireless local loop systems may find greatest usage in developing third world countries where local PSTN services is limited. Users in such countries often encounter delays in receiving a dial tone through the PSTN. Hence any delays encountered through the wireless local loop system will not likely be regarded as unusual or significantly disadvantages.

By deferring the dial tone, potential confusion or annoyance is avoided that could otherwise result if the user is presented with a dial tone when the system is loaded. Moreover, by deferring the dial tone, the remote station also defers transmission of signals on the access channel until the load condition is over. Thus, CDMA interference problems of the type discussed above are also avoided. Indeed, by eliminating additional access signals for calls that cannot be accommodated, the system can effectively increase its overall capacity, perhaps allowing more traffic channels. Also, more efficient usage is made of the base station which need not devote resources to processing access channel signals for calls that cannot be accommodated.

Figure 3:
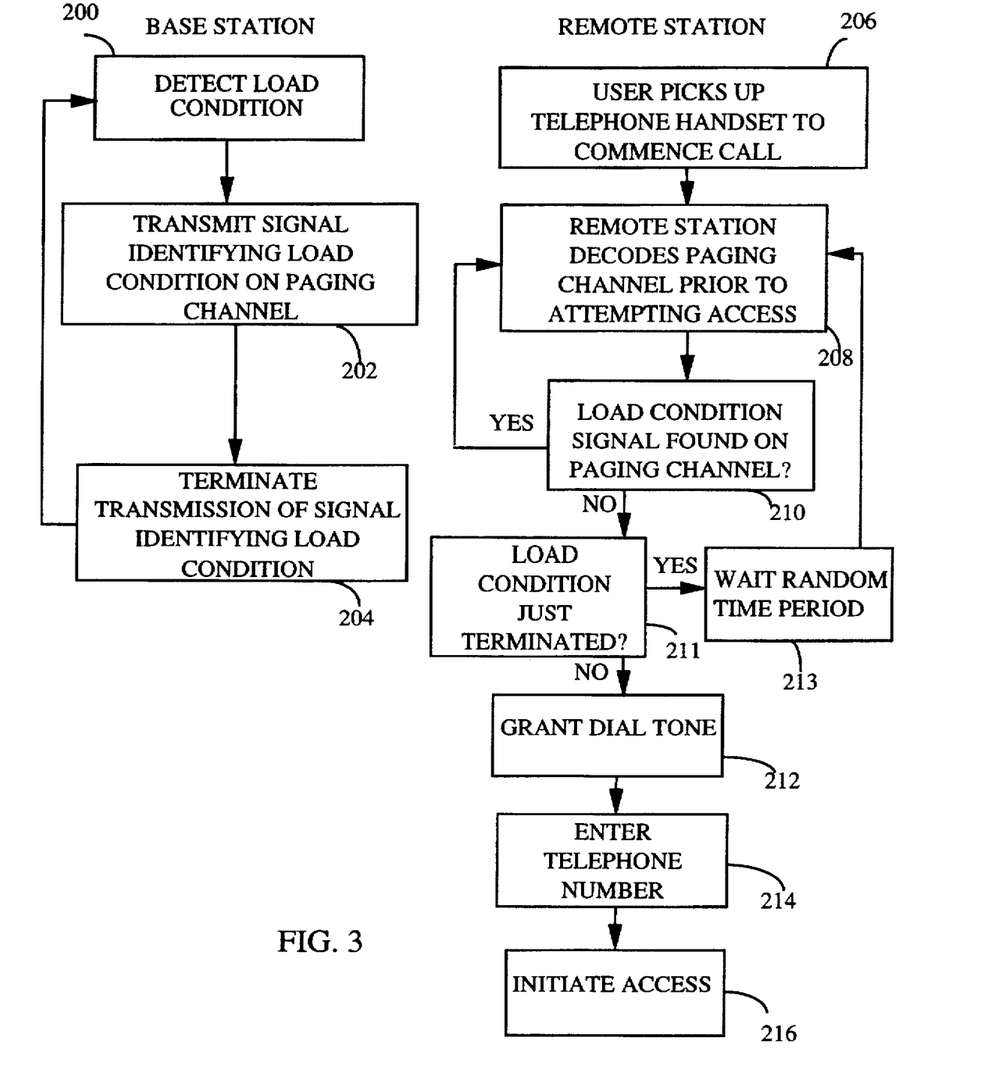
FIG. 3 is a flow chart illustrating an alternative method to that of FIG. 2 wherein the remote station further defers granting the dial tone for a randomly determined time period following resolution of the load condition.

In the system of FIG. 2, a call access is attempted immediately after the load condition is resolved. This, however, can result in a new load condition immediately occurring as a result of numerous remote stations each attempting an access once the previous load condition is resolved. FIG. 3 illustrates an alternative embodiment wherein each remote station further delays system access for a different randomly determined period of time following resolution of the load condition. Hence, if several remote stations need access following resolution of the load condition, each will likely attempt access at different times, thereby diminishing the possibility of a new load condition. Many of the steps of FIG. 3 correspond to those of FIG. 2 and, for brevity, the description of these steps is not repeated. Corresponding steps are identified by corresponding references numerals incremented by one hundred.

Within FIG. 3, after the system emerges from a load condition, at step 210, the remote station detects same, at step 211, and execution proceeds to step 213 where the remote station waits a randomly determined amount of time. The time period may be determined, for example, by generating a random number between 0 and t where t is a predetermined randomization window time period, such as 1 second or 10 seconds. The value of t can transmitted over the paging channel from the base station. After step 213, the remote station decodes the paging channel to ensure that no new load condition has occurred. If not, execution proceeds through step 211 to step 214 where a dial tone is provided to the user. If a second load condition is detected at step 210, execution proceeds in a loop defined by steps 208 and 210 until the load condition is resolved. The remote station then waits another random time period before again polling the paging channel. The randomization time period t is selected such that it is highly unlikely that a second load condition will occur immediately following the first and at the same time, user access to the system is not delayed unnecessarily. Such may be achieved by providing randomization over a sufficiently long time period, i.e. by selecting an appropriately large value for t. The value for t may be adaptively varied in accordance with previous system history to minimize the average amount of additional delay occurring at step 213 while also substantially preventing further immediate load conditions. A variety of conventional adaptive filters may be employed by the base station to vary the value of t which, as noted above, is broadcast over the paging channel such that each remote station has access to the same value.

Actual generation of the random value within the time window defined by t for use in step 213 is performed by the remote station. By "random", it is meant that any random or pseudo-random value may be used. Indeed, even non-random values can be employed, consistent with the invention, so long that further access attempts by the various remote stations following a load condition are usually staggered in time. A wide range of other techniques can be implemented to achieve the same or similar results.

Figure 4:
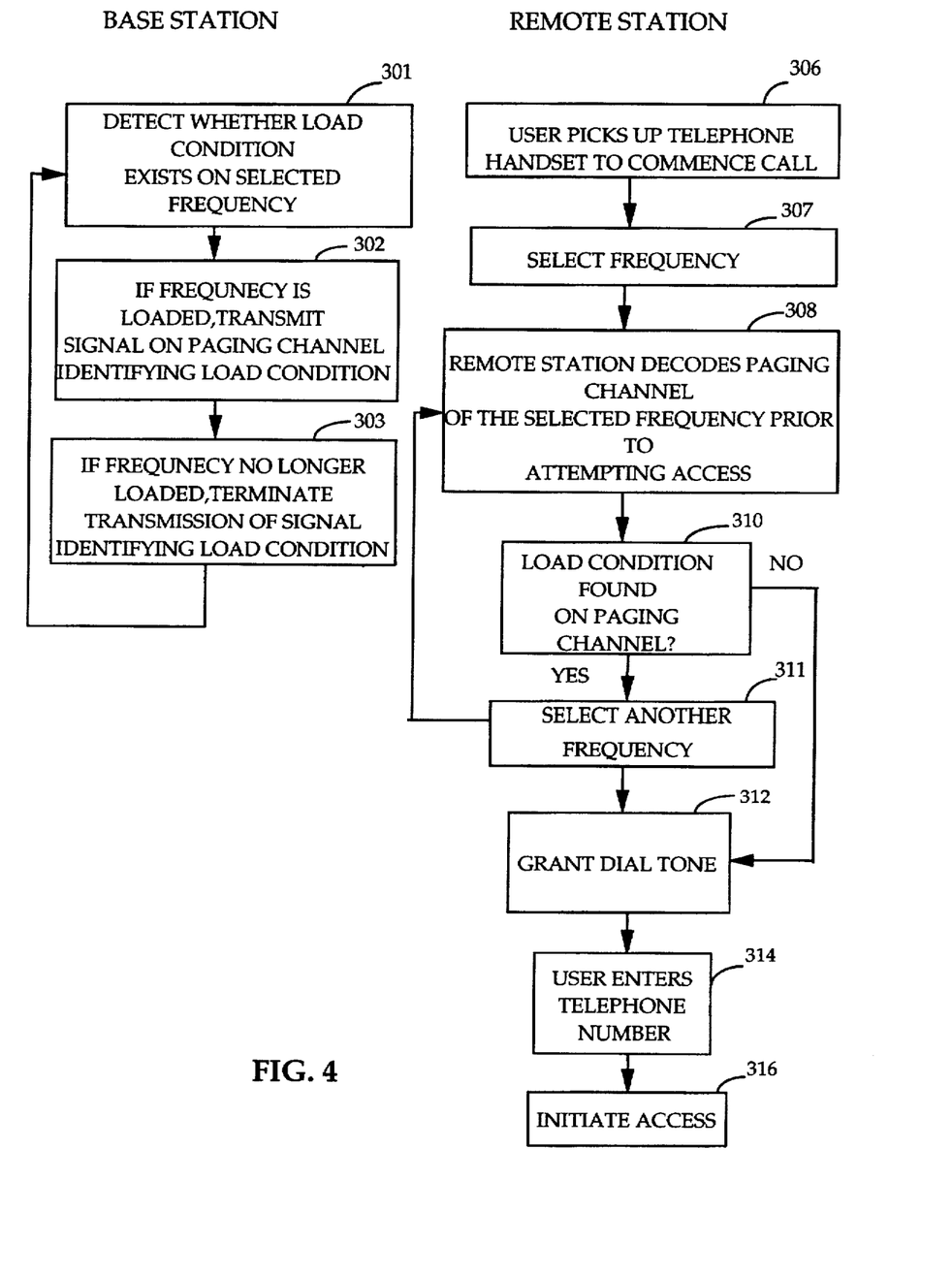
FIG. 4 is a flow chart illustrating an another alternative method to that of FIG. 2 wherein the remote station sequentially checks a plurality of frequencies to determine if a frequency is available.
Figure 5:
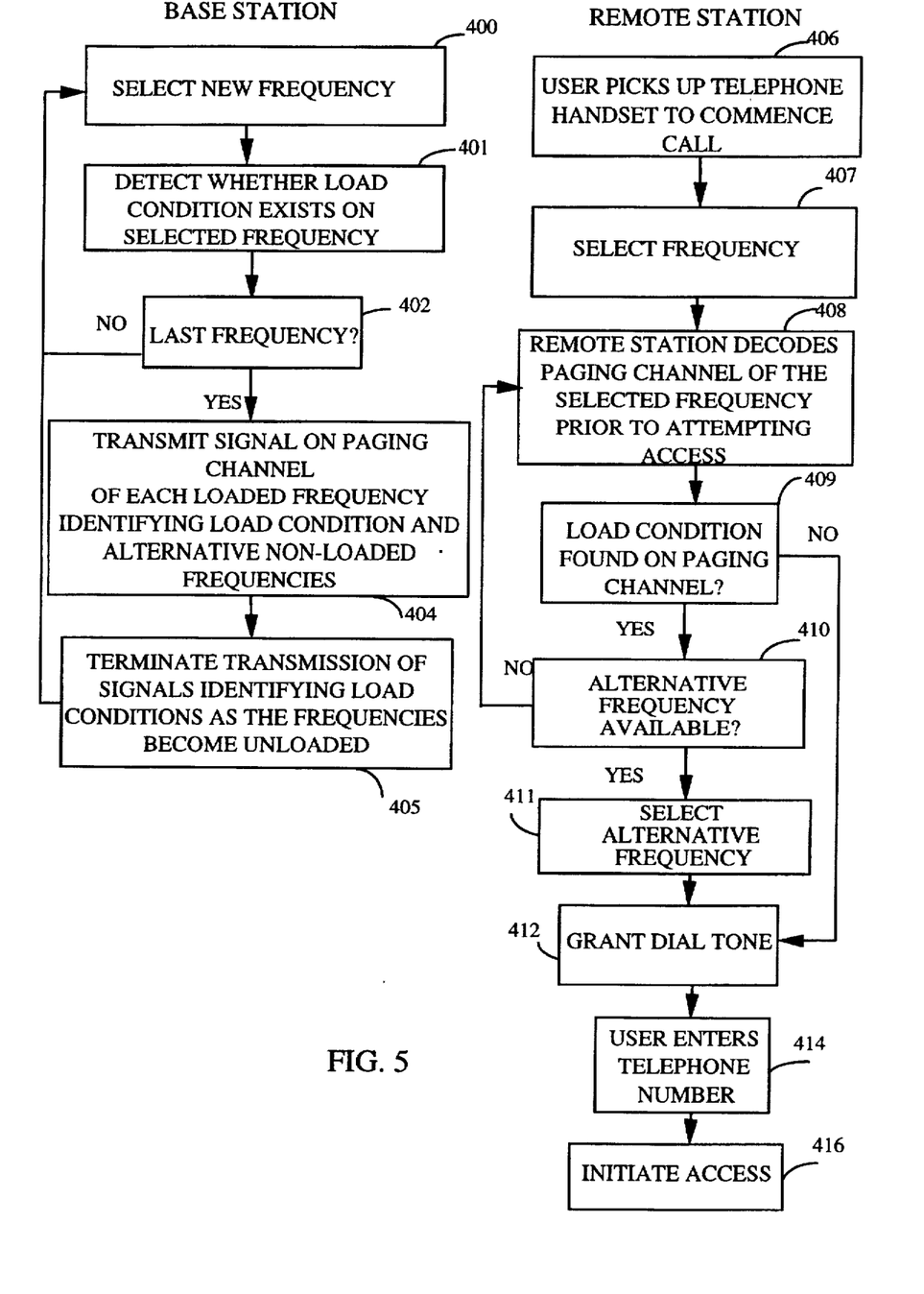
FIG. 5 is a flow chart illustrating an alternative method to that of FIG. 4 wherein the base station transmits a signal identifying alternative non-loaded channel.
Figure 6:
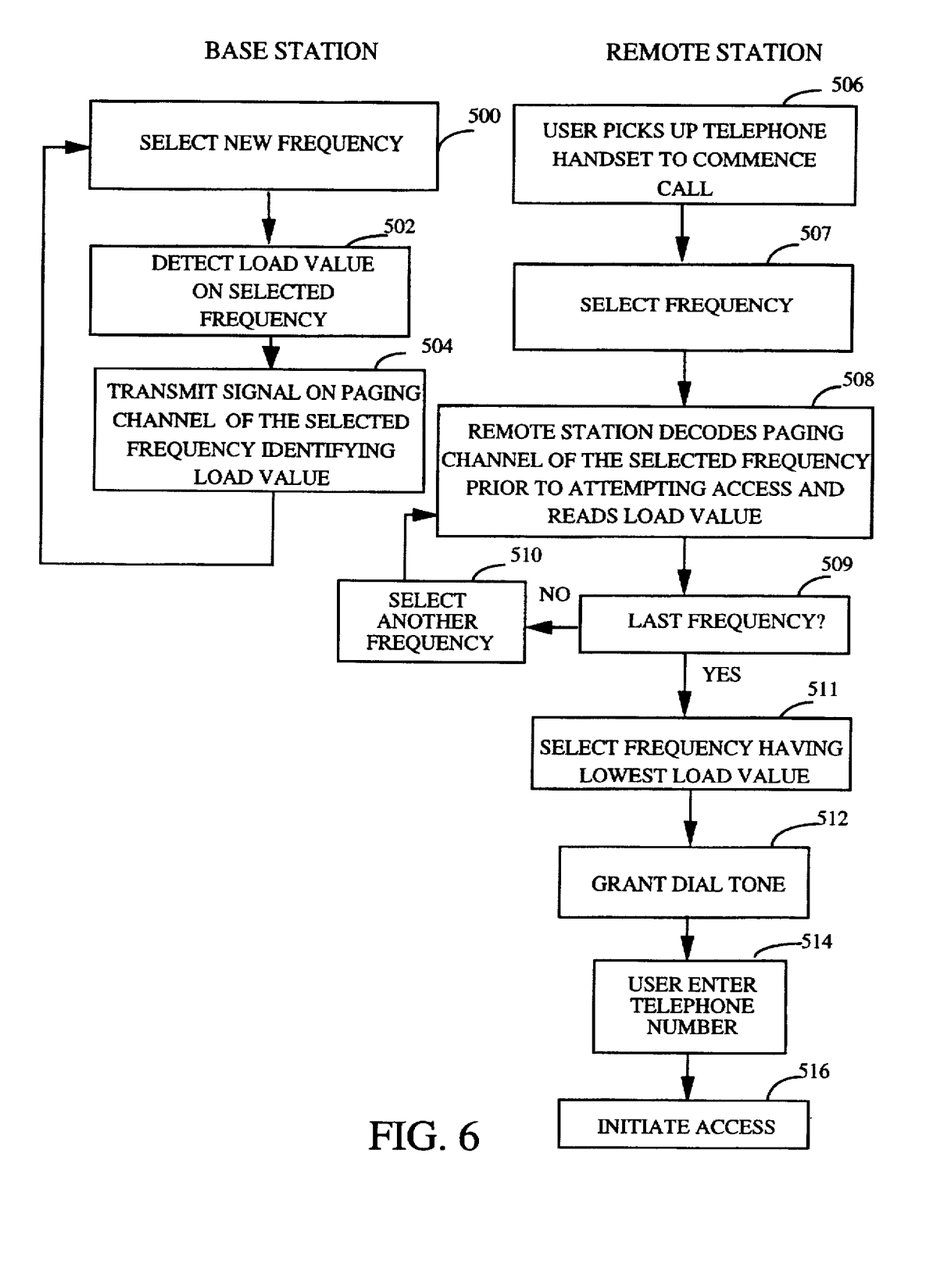
FIG. 6 is a flow chart illustrating an alternative method to that of FIG. 5 wherein the base station transmits load level information, even when not under a load condition, and wherein the remote station scans each of the available frequencies in search of one having the lowest load level.

Thus far, the systems discussed are systems, such as single frequency CDMA systems, where the system is either loaded or not. FIGS. 4-6 illustrate systems employing multiple frequencies wherein a load condition can occur on one frequency, while others remain free for further transmissions.

FIG. 4 illustrates a system wherein a set of separate CDMA frequencies are employed each having a unique paging channel. The base station detects whether the selected frequency is subject to a load condition, at step 301. If so, a signal indicating the load condition is transmitted on the paging channel associated with the selected frequency, at step 302. If the frequency is no longer loaded, transmission of the load condition signal is terminated, at step 303. As before, the presence or absence of a load condition can be signaled in a variety of ways. The loop defined by steps 301-303 is repeated continuously thereby periodically updating the load condition signals for all frequencies.

The operation of the remote station will now be described. After a user takes the handset off-hook, at step 306, the remote station selects one of the frequencies, step 307, then determines whether the selected frequency is subject to a load condition, steps 308 and 310. If so, the remote station selects another frequency, step 311, and repeats steps 308 and 310 for the new frequency. The remote station continues to select new frequencies until one is found that is not subject to a load condition. If each frequency is loaded, the remote station simply cycles through the frequencies again and again until one becomes available. The remote station then grants a dial tone and proceeds as in FIG. 2. Although not shown in FIG. 4, the remote station may also implement the randomization process described with reference to FIG. 3.

Thus in the system of FIG. 4, each paging signal identifies whether the associated frequency is loaded and the remote station sequentially decodes the various paging channels until a frequency is found which is not loaded. In the system of FIG. 5, each paging channel also carries information identifying other available, i.e. non-loaded, frequencies. More specifically, the base station executes steps 400-402 for each frequency to determine which, if any, are loaded. Thereafter, at step 404, the base station transmits a signal on the paging channel of each loaded frequency indicating that the frequency is loaded and identifying an alternative channel, if one is available. As frequencies become available, the base station terminates the transmission of the load indication signals on the previously loaded frequencies, step 405. As can be appreciated, some frequencies can become loaded as others become unloaded. The base station tracks the load status of each of the frequencies and initiates or terminates the load indication signals and the alternative channel signals accordingly.

Upon detection of an off-hook condition, at step 406, the remote station selects one of the frequencies and determines whether it is loaded, at steps 407 and 408. If it is not loaded, a dial tone is granted and a call initiated as before, steps 412-416. If however, the selected frequency is loaded, the remote station decodes the paging channel to determine if an alternative frequency is available, at step 410, and if so the remote station selects the alternative frequency, at step 411. If no alternative frequency is available, then the remote station cycles through steps 408-410 until an non-loaded frequency is selected or a suitable alternate frequency is identified.

Figure 7:
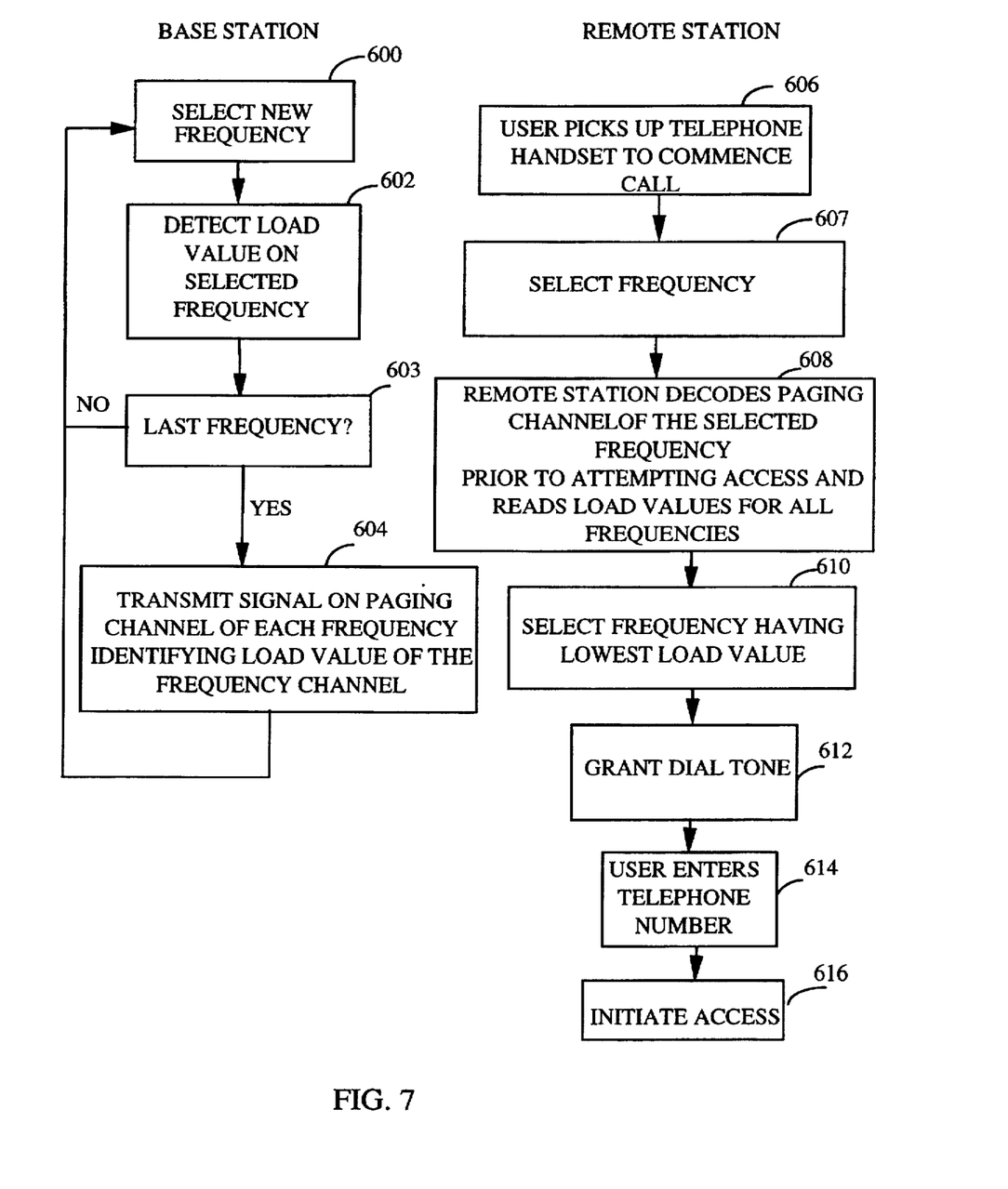
FIG. 7 is a flow chart illustrating an alternative method to that of FIG. 6 wherein the base station transmits load level information for all frequencies on all paging channels and wherein the remote station determines the frequency having the lowest level by accessing any paging channel.

Thus FIGS. 2-5 illustrate embodiments wherein the base station transmits information regarding load conditions, i.e. frequencies which cannot handle additional traffic, to the remote stations. FIGS. 6 and 7 illustrate embodiments wherein the base station transmits load level information even when frequencies are not fully loaded, such that the remote stations can select the least busy frequency.

In FIG. 6, at step 500, the base station selects a frequency, then determines the load value or load level on the selected frequency, at step 502. The load value is a quantity representing the amount of traffic on the channel and may represent, for example, the total power transmitted on the frequency or the bits per second of information transmitted. Other quantitative values may alternatively be employed. The load value may be scaled, such as from 0 to 100, with 100 indicating a fully loaded frequency and 0 representing a frequency carrying no traffic. At step 504, the base station transmits a signal representative of the load value on the paging channel of the selected frequency. The signal may be a binary encoded representation of the load value.

Once a user takes the handset of the remote station off-hook, at step 506, the remote station selects a frequency, step 508, then decodes the paging channel of the selected frequency and reads the load value information carried thereon. The remote station stores the load value then cycles through the remaining frequencies (by executing steps 508, 509 and 510 repeatedly) while storing the relative load values for each of the frequencies. At step 511, the remote station accesses the stored values then selects the frequency having the lowest load value and proceeds with granting a dial tone and attempting an access as before (steps 512, 514 and 516).

In this manner, the remote station determines the least loaded frequency and attempts an access thereon. This helps prevent load conditions from occurring. Although not shown in FIG. 6, logic similar to that of FIGS. 2-5 can be employed to defer granting a dial tone if all of the frequencies are fully loaded. Furthermore, randomization techniques, such as described with reference to FIG. 3, can be employed to prevent remote stations from all attempting to immediately access a newly available frequency which could otherwise create a new load condition.

In FIG. 6, each frequency carries load value information only for that frequency and the remote station must poll all frequencies before determining which has the lowest load value. In the system of FIG. 7, each paging channel carries the relative load values for all frequencies, thereby allowing the remote stations to determine the lowest load value by polling a single paging channel. The steps of FIG. 7 are similar to those of FIG. 6 and only pertinent differences will be described. Whereas, the system of FIG. 6 transmits a load value on a selected frequency, then repeats with a different frequency, the system of FIG. 7 determines all load values before transmitting all values on all frequencies (steps 600–604). The remote station, upon the detection of an off-hook condition, selects one channel, reads the load value information for all frequencies from the paging channel of that frequency, determines which frequency is the least loaded, then attempts an access thereon (steps 606–616).

In yet another embodiment, not shown, the base station simply transmits (on each paging channel) the identity of the alternative frequency, if any, having the lowest load value. The remote station selects any frequency, reads the alternative frequency therefrom, and proceeds to access the alternative frequency. Hence, each paging channel need not carry the load values of all other frequencies.

Figure 8:
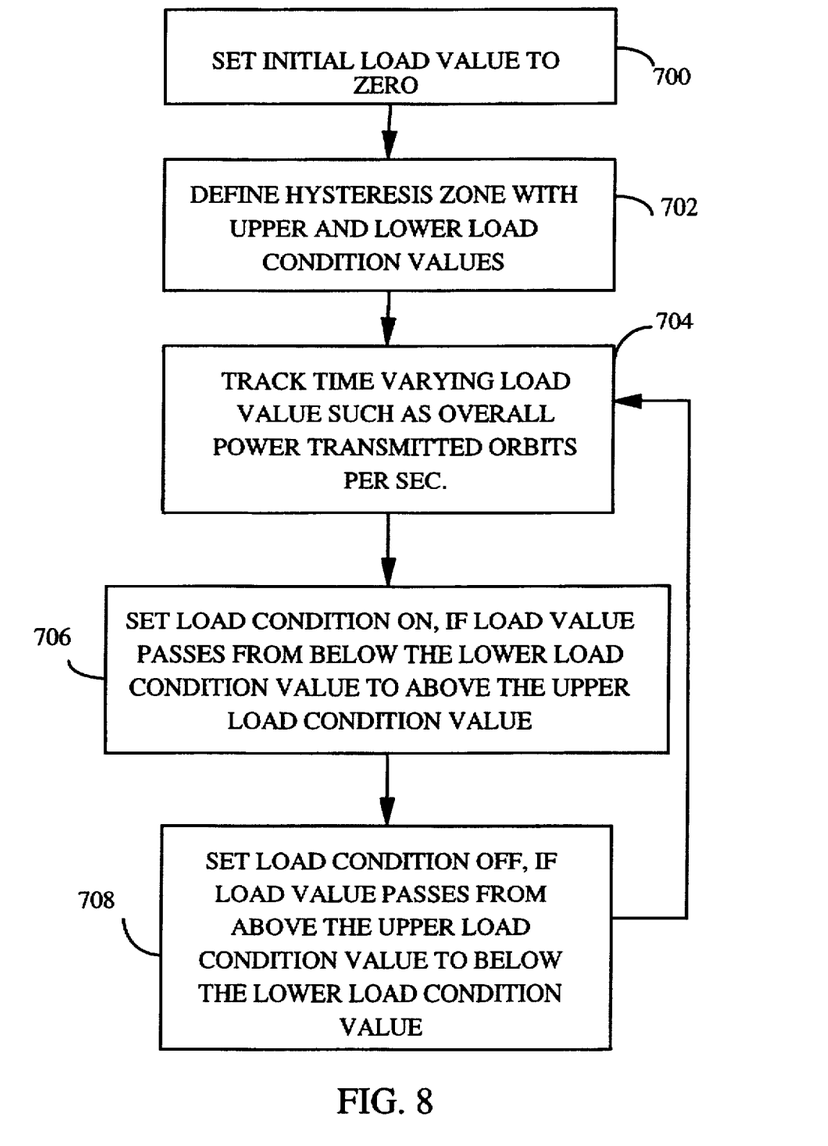
FIG. 8 is a flow chart illustrating a method implemented by the base station of FIG. 1 for determining whether to assert or de-assert a load condition signal.
Figure 9:
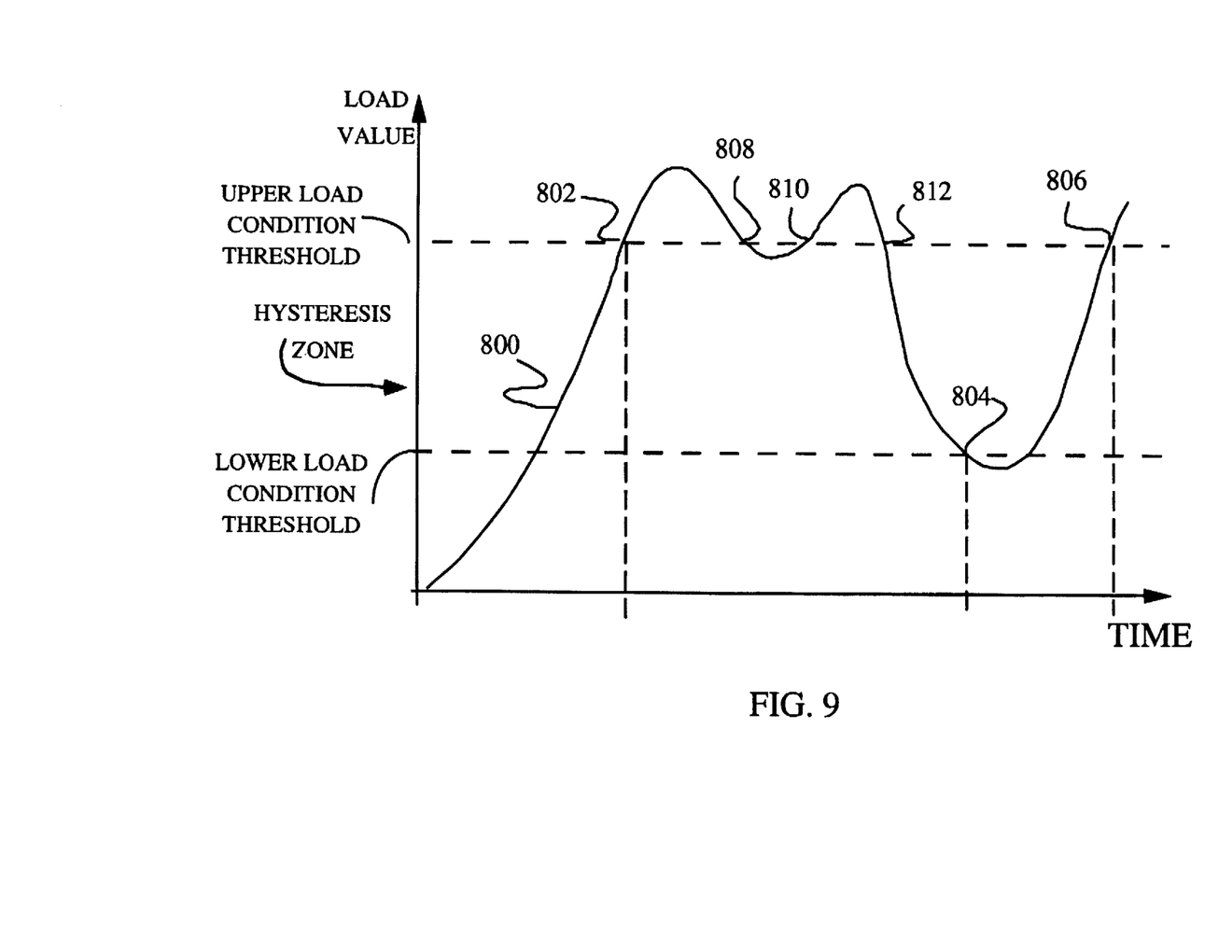
FIG. 9 is a graph illustrating an exemplary load level varying as a function of time.

Hence, FIGS. 2-7 illustrate various methods for processing load information. With reference to FIGS. 8 and 9, a method by which the base station determines load conditions will be described. The method is designed to avoid hysterisis problems from occurring during the determination of a load condition.

As noted above, a load condition can be determined by calculating a quantitative value for the load, perhaps total power or total bits per second, then comparing the calculated value against a threshold value. A problem, however, can occur if the calculated value deviates slightly near the threshold value causing the system to rapidly switch back and forth between load and non-load conditions. In the system of FIG. 8 and 9, upper and lower threshold values are pre-selected. A load condition is only deemed to occur if the calculated load value passes from below the lower threshold value to above the upper threshold value or vice versa. Hence, the upper and lower values define a hysterisis zone.

In FIG. 8, at step 700, the load value is initially set to zero (or some other suitable starting value). The hysterisis zone is defined, at step 702, by selecting upper and lower threshold values. At step 704, the system tracks the load value. At 706, if the load value passes from below the lower threshold to above the upper threshold, a load condition is declared and appropriate action is taken (such as described above with reference to FIGS. 2-7). At step 708, if the load value passes from above the upper load threshold to below the lower threshold, the load condition is set to "off" and appropriate action is taken. Steps 704-708 are repeated periodically during operation of the system. In the embodiment described, the steps of FIG. 8 are performed by the base station. In other embodiments, at least some of the steps may be performed by the remote stations. For example, the base station may merely transmit the load value, leaving the remote stations to perform the hysterisis check. Also, the upper and lower threshold values may be adaptively varied during operation of the system.

FIG. 9 graphically illustrates an exemplary load value 800 varying with time. Using the method of FIG. 8, a load condition is deemed to begin at time 802, then terminate at time 804. A second load condition is deemed to begin at time 806. Note that passage of the load value through the upper threshold, at times 808, 810, and 812 is not sufficient to cause the system to change the load condition status. In FIG. 9, the difference between the upper and lower threshold values is exaggerated to more clearly illustrate the basic concept. In practice, the upper and lower threshold values may differ only slightly, depending upon overall system behavior.

What has been described is a system for managing load condition information and other load information within a wireless local loop system. In most embodiments specifically described, the grant of a dial tone to a remote station user is deferred until a load condition is terminated or until a frequency is found which is not subject to a load condition. However, in other embodiments, other steps may be taken in response to the determination of load conditions. Likewise, although the invention is primarily described with reference to a wireless local loop system employing CDMA technology, principles of the invention are applicable to other systems as well, particularly other cellular systems.

In general, the exemplary embodiments of the invention are merely illustrative of general principles of the invention which can be applied to other applications, to achieve other ends and to remedy other problems not specified herein.

I claim:

1. A method for generating a dial tone within a wireless local loop signal transmission system subject to possible load conditions, said wireless local loop signal transmission system having a base station and a remote station, said method comprising the steps of:

receiving signals at the remote station representative of whether a load condition exists within the wireless local loop signal transmission system;

detecting a handset of the remote station being taken off-hook; and if a load condition does not exist, outputting a simulated dial tone through the handset of the remote station substantially immediately; and if a load condition does exist, waiting until receipt of a signal indicating that the wireless local loop signal transmission system is no longer subject to the load condition while outputting no audible signal through the hand set of the remote station then, if the handset is still off-hook, selecting an additional delay period of time then waiting the additional period of time following receipt of the signal indicating that the wireless local loop signal transmission system is no longer subject to the load condition before outputting the simulated dial tone through the handset of the remote station.

2. The method of claim 1 further including the steps, performed by the base station, of determining whether a load condition exists within the wireless local loop signal transmission; and transmitting signals to the remote station identifying whether a load condition exists.

3. The method of claim 2 wherein the base station transmits a paging signal and wherein the signals indicative of whether a load condition exists are transmitted within said paging signal.

4. The method of claim 1 wherein the step of selecting an additional delay period is performed by receiving a value representative of a randomization time window and selecting the additional delay period of time substantially at random within that time window.

5. The method of claim 4 wherein the duration of the time window is adaptively varied in length in accordance with previous system history to reduce the average amount of additional delay while also ensuring that the likelihood that another load condition will re-occur immediately is reduced.

6. The method of claim 2 wherein the system operates on plurality of frequencies and wherein said step of determining whether a load condition exists is performed on a frequency by frequency basis.

7. The method of claim 6 wherein said step of determining whether a load condition exists on a frequency by frequency basis is performed by:

selecting a frequency;

determining whether a load condition exists on that frequency;

if so, selecting an alternative frequency and determining whether a load condition exists on that frequency; and repeating until a non-loaded frequency is found.

8. The method of claim 7 wherein the signals transmitted from the base station identify at least one frequency, if any, not under a load condition.

9. (Amended) The method of claim 2 wherein the step of determining whether a load condition exists within the wireless local loop signal transmission system includes the steps, performed by the base station, of:

setting upper and lower load condition values;

calculating a value representative of the load level;

identifying a load condition as beginning when said value passes from below said lower value to above said upper value; and identifying a load condition as terminating when said load value passes from above said upper value to below said lower value.

10. The method of claim 1 further including the step of determining whether a load condition exists within the wireless local loop signal transmission system by determining whether a number of bits per second transmitted by the system exceeds a predetermined threshold.

11. The method of claim 1 further including the step of determining whether a load condition exists within the wireless local loop signal transmission system by determining whether a total power transmitted by the base station of the system exceeds a predetermined threshold.

12. An apparatus for generating a dial tone within a wireless local loop signal transmission system subject to possible load conditions, said wireless local loop signal transmission system having a base station and a remote station, said apparatus comprising:

means for receiving signals at the remote station representative of whether a load condition exists within the wireless local loop signal transmission system;

means for detecting a handset of the remote station being taken off-hook;

means for selecting a time delay;

means, operative to a detection that the handset has been taken off-hook when a load condition does not exist, for outputting a simulated dial tone through the handset of the remote station substantially immediately; and means, operative to a detection that the handset has been taken off-hook when a load condition does exist, for waiting until receipt of a signal indicating that the wireless local loop signal transmission system is no longer subject to the load condition while outputting no audible signal through the hand set of the remote station then, if the handset is still off-hook, controlling the means for selecting a delay to select an additional delay period of time then waiting the additional period of time following receipt of the signal indicating that the wireless local loop signal transmission system is no longer subject to the load condition before outputting the simulated dial tone through the handset of the remote station.

13. The apparatus of claim 12 further including, within the base station, means for determining whether a load condition exists within the wireless local loop signal transmission: and means for transmitting signals to the remote station identifying whether a load condition exists.

14. The apparatus of claim 13 wherein the base station transmits a paging signal and wherein the signals indicative of whether a load condition exists are transmitted within said paging signal.

15. The apparatus of claim 12 wherein the additional delay period of time is selected by receiving a signal representative of a randomization time window and selecting the additional delay period of time substantially at random within that time window.

16. The apparatus of claim 15 wherein the duration of the time window is adaptively varied in length in accordance with previous system history to reduce the average amount of additional delay while also ensuring that the likelihood that another load condition will re-occur immediately is reduced.

17. The apparatus of claim 13 wherein the system operates on plurality of frequencies and wherein said means for determining whether a load condition exists operates on a frequency by frequency basis.

18. The apparatus of claim 17 wherein said means for determining whether a load condition exists on a frequency by frequency basis comprises:

means for selecting a frequency;

means for determining whether a load condition exists on that frequency; and means, operative in response to a determination that a load condition exists on that frequency, for selecting an alternative frequency and determining whether a load condition exists on the alternative frequency; and means for controlling operation of the means for selecting a frequency, the means for determining whether a load condition exists and the means for selecting an alternative frequency, to repeat until a non-loaded frequency is found.

19. The apparatus of claim 18 wherein the signals transmitted from the base station identify at least one frequency, if any, not under a load condition.

20. The apparatus of claim 13 wherein the means for determining whether a load condition exists within the wireless local loop signal transmission system includes means, within the base station, for:

setting upper and lower load condition values;

calculating a value representative of the load level;

identifying a load condition as beginning when said value passes from below said lower value to above said upper value; and identifying a load condition as terminating when said load value passes from above said upper value to below said lower value.

21. An apparatus for generating a dial tone within a wireless local loop signal transmission system subject to possible load conditions, said wireless local loop signal transmission system having a base station and a remote station, said apparatus comprising:

a load condition signal reception unit;

a handset off-hook detection unit;

a simulated dial tone generation unit;

a delay unit; and a control unit, operative in response to a detection by the off-hook detection unit that the handset has been taken off-hook and reception by the load condition signal reception unit of a signal indicating that a load condition does not exist, for controlling the dial tone generation unit to output a simulated dial tone through the handset of the remote station substantially immediately, and further operative in response to a detection by the off-hook detection unit that the handset is still off-hook and reception of a signal by the load condition signal reception unit that a load condition no longer exists, for waiting until receipt of a signal indicating that the wireless local loop signal transmission system is no longer subject to the load condition while outputting no audible signal through the hand set of the remote station then, if the handset is still off-hook, for triggering the delay unit to generate an additional delay period of time following receipt of the signal indicating that the wireless local loop signal transmission system is no longer subject to the load condition before then controlling the dial tone generation unit to output the simulated dial tone through the handset of the remote station following the additional delay time.

22. The apparatus of claim 21 further including, within the base station, a load condition determination unit; and a transmitter for transmitting signals to the remote station identifying whether a load condition exists.

23. The apparatus of claim 22 wherein the base station includes a transmitter for transmitting a paging signal and wherein the signals indicative of whether a load condition exists is transmitted within said paging signal.

24. The apparatus of claim 21 wherein the additional period of time is selected by receiving a value representative of a randomization time window and by selecting a value substantially at random within that time window.

25. The apparatus of claim 24 wherein the duration of the time window is adaptively varied in length in accordance with previous system history to reduce the average amount of additional delay while also ensuring that the likelihood that another load condition will re-occur immediately is reduced.

26. The apparatus of claim 22 wherein the system operates on plurality of frequencies and wherein said load condition determination unit operates on a frequency by frequency basis.

27. The apparatus of claim 26 wherein said load condition determination unit comprises:

a frequency selection unit;

a frequency-specific load condition determination unit; and a control unit for controlling operation of the frequency selection unit and the frequency-specific load condition determination unit, to repeatedly select and test different frequencies until a non-loaded frequency is found.

28. The apparatus of claim 27 wherein the signals transmitted from the base station identify at least one frequency, if any, not under a load condition.

29. The apparatus of claim 22 wherein the load condition determination unit includes a hysteresis avoidance unit for:

setting upper and lower load condition values;

calculating a value representative of the load level;

identifying a load condition as beginning when said value passes from below said lower value to above said upper value; and identifying a load condition as terminating when said load value passes from above said upper value to below said lower value.

30. A method for generating a dial tone within a wireless local loop signal transmission system subject to possible load conditions, said wireless local loop signal transmission system having a base station and a remote station, said method comprising the steps of:

determining whether a load condition exists within the wireless local loop signal transmission system by employing a power control feedback system to determine whether a total power transmitted by the base station of the system exceeds a predetermined threshold;

detecting a handset of the remote station being taken off-hook; and if a load condition does not exist, outputting a simulated dial tone through the handset of the remote station substantially immediately; and if a load condition does exist, waiting until the wireless local loop signal transmission system is no longer subject to the load condition while outputting no audible signal through the hand set of the remote station then, if the handset is still off-hook, outputting the simulated dial tone through the handset of the remote station.

31. The method of claim 30 wherein the step of determining whether a load condition exists within the wireless local loop signal transmission system includes the step, performed by the remote station, of receiving signals transmitted from the base station identifying whether a load condition exists.

32. The method of claim 31 wherein the base station transmits a paging signal and wherein the information indicative of whether a load condition exists is transmitted within said paging signal.

33. The method of claim 31 wherein the step of waiting until the wireless local loop system is no longer subject to the load condition while outputting no audible signal through the handset of the remote station then, if the handset is still off-hook, outputting a simulated dial tone through the handset of the remote station includes the further step of setting a timer to trigger outputting of the simulated dial tone after an additional period of time has elapsed following reception of a signal identifying that the system is no longer subject to a load condition, said additional period of time being determined substantially at random.

34. The method of claim 33 wherein the an additional delay period is determined by receiving a value representative of a randomization time window and selecting the additional delay period of time substantially at random within that time window.

35. The method of claim 34 wherein the duration of the time window is adaptively varied in length in accordance with previous system history to reduce the average amount of additional delay while also ensuring that the likelihood that another load condition will re-occur immediately is substantially minimized.

36. The method of claim 31 wherein the system operates on plurality of frequencies and wherein said step of determining whether a load condition exists is performed on a frequency by frequency basis.

* * * * *